(12) United States Patent
Young et al.

(10) Patent No.: US 9,593,517 B2
(45) Date of Patent: Mar. 14, 2017

(54) VEHICLES HAVING LOAD-TRANSFERRING HOOD HINGE MEMBERS

(71) Applicant: Toyota Motor Engineering & Manufacturing North America, Inc., Erlanger, KY (US)

(72) Inventors: Jonathan R. Young, Saline, MI (US); Corinne D. Uskali, Ann Arbor, MI (US); Colin M. Ravenscroft, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 43 days.

(21) Appl. No.: 14/587,680

(22) Filed: Dec. 31, 2014

(65) Prior Publication Data

US 2016/0186472 A1 Jun. 30, 2016

(51) Int. Cl.
*B60R 21/38* (2011.01)
*E05D 5/06* (2006.01)
*B62D 25/04* (2006.01)
*B62D 25/14* (2006.01)
*B60R 21/34* (2011.01)

(52) U.S. Cl.
CPC .............. *E05D 5/062* (2013.01); *B60R 21/34* (2013.01); *B62D 25/04* (2013.01); *B62D 25/14* (2013.01); *B60R 2021/343* (2013.01)

(58) Field of Classification Search
CPC ...... B62D 21/15; B62D 25/12; B62D 25/081; B62D 25/14; B62D 25/105; B60R 2021/343; B60R 21/34; B60R 21/38
USPC .......... 296/193.11, 187.09, 192, 193.1, 201, 296/96.21; 180/274, 69.21, 223, 387
See application file for complete search history.

(56) References Cited

U.S. PATENT DOCUMENTS

| | | | |
|---|---|---|---|
| 4,580,315 A * | 4/1986 | Beckwith | E05F 1/1238 16/289 |
| 6,892,843 B2 * | 5/2005 | Schillaci | E05C 17/24 180/274 |

(Continued)

FOREIGN PATENT DOCUMENTS

| | | |
|---|---|---|
| EP | 2106976 B1 | 3/2011 |
| JP | 04-108486 | 3/1991 |

(Continued)

*Primary Examiner* — Glenn Dayoan
*Assistant Examiner* — Sunsurraye Westbrook
(74) *Attorney, Agent, or Firm* — Dinsmore & Shohl LLP (57) ABSTRACT

Vehicles incorporating load-transferring hood hinge members are disclosed. In one embodiment, a vehicle includes an A-pillar portion, an upper side member coupled to the A-pillar portion and extending forward from the A-pillar portion in a vehicle longitudinal direction, and a dash panel coupled to the A-pillar portion and extending in a vehicle lateral direction that is transverse to the vehicle longitudinal direction. The vehicle also includes a hood hinge member that is coupled to the upper side member and positioned forward of the A-pillar portion. The hood hinge member includes an attachment portion that is coupled to the upper side member, a flange member that extends upward from the attachment portion, a hood attachment opening passing through the flange member, and a rearward-projecting protrusion having a distal surface that is positioned transverse to the flange member.

18 Claims, 4 Drawing Sheets

(56) References Cited

U.S. PATENT DOCUMENTS

| | | | |
|---|---|---|---|
| 7,774,900 B2 * | 8/2010 | Shaw | E05D 3/145 16/343 |
| 8,167,362 B2 | 5/2012 | Furumoto | |
| 8,336,666 B2 * | 12/2012 | Thomas | B60R 21/34 180/274 |
| 8,651,552 B2 | 2/2014 | Shibutake et al. | |
| 8,726,466 B2 | 5/2014 | Kim | |
| 8,899,363 B1 * | 12/2014 | LaPorte | B62D 25/12 180/69.2 |
| 2005/0088016 A1 | 4/2005 | Ito et al. | |
| 2010/0270829 A1 | 10/2010 | Furumoto | |

FOREIGN PATENT DOCUMENTS

| | | |
|---|---|---|
| JP | 2008087508 A | 4/2008 |
| JP | 2011156966 A | 8/2011 |
| JP | 2013001215 A | 1/2013 |

\* cited by examiner

VEHICLES HAVING LOAD-TRANSFERRING HOOD HINGE MEMBERS

TECHNICAL FIELD

The present specification generally relates to vehicles that include hood hinge members and, in particular, to vehicles that include hood hinge members that include elements to contact an A-pillar portion upon deformation.

BACKGROUND

When a vehicle is involved in an impact, the energy of the impact tends to deform and displace vehicle body components. In the event of vehicle colliding with a barrier in a frontal impact, front bumper may be deformed by the barrier and absorb energy of the impact. Additionally, the hood of the vehicle may be deformed as the hood of the vehicle impacts the barrier. The hood may also be translated rearward toward the windshield of the vehicle. However, a large rearward and/or upward translation of the hood relative to its original position may be undesirable.

Accordingly, vehicle structures for managing the position of the hood as the hood is deformed and translated from an impact may be desired.

SUMMARY

In one embodiment, a vehicle includes an A-pillar portion, an upper side member coupled to the A-pillar portion and extending forward from the A-pillar portion in a vehicle longitudinal direction, and a dash panel coupled to the A-pillar portion and extending in a vehicle lateral direction that is transverse to the vehicle longitudinal direction. The hood hinge member includes an attachment portion that is coupled to the upper side member, a flange member that extends upward from the attachment portion, a hood attachment opening passing through the flange member, and a rearward-projecting protrusion having a distal surface that is positioned transverse to the flange member.

In another embodiment, a vehicle includes an A-pillar portion, an upper side member coupled to the A-pillar portion and extending forward from the A-pillar portion in a vehicle longitudinal direction, and a dash panel coupled to the A-pillar portion and extending in a vehicle lateral direction that is transverse to the vehicle longitudinal direction. The vehicle also includes a hood hinge member that is coupled to the upper side member and positioned forward of the A-pillar portion, where the hood hinge member has a hood hinge member deformation limit that causes the hood hinge member to contact the A-pillar portion, and a hood coupled to the hood hinge member and repositionable between an open position and a closed position, the hood having a buckling load limit at which the hood buckles. The hood hinge member deformation limit of the hood hinge member is greater than the buckling load limit of the hood.

In yet another embodiment, a vehicle includes an A-pillar portion, an upper side member that is coupled to the A-pillar portion and extends forward from the A-pillar portion in a vehicle longitudinal direction, and a dash panel that is coupled to the A-pillar portion and extends in a vehicle lateral direction that is transverse to the vehicle longitudinal direction. The vehicle also includes a hood hinge member that is coupled to the upper side member and is positioned forward of the A-pillar portion. The hood hinge member includes an attachment portion that is coupled to the upper side member, a flange member that extends upward from the attachment portion, and a hood attachment opening that passes through the flange member. The hood hinge member is repositionable between a deactivated configuration in which the hood hinge member is spaced apart from the A-pillar portion and an activated configuration in which the hood hinge member contacts the A-pillar portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles having load-transferring hood hinge members are described herein. Such vehicles may include an A-pillar portion, an upper side member that is coupled to the A-pillar portion and extending forward A-pillar portion in a vehicle longitudinal direction, and a dash panel coupled to the A-pillar portion and extending in a vehicle lateral direction. The A-pillar portions of the vehicles may also extend in a vehicle vertical direction and rearward in the vehicle longitudinal direction. The vehicles may further include hood hinges that are coupled to the upper side members and are positioned forward of the A-pillar portions. The hinge member may include an attachment portion, a flange member, a hood attachment opening, and a rearward-projecting protrusion that includes a distal surface that is positioned transverse to the flange member. When a rearward load is applied to the hood hinge member, the hood hinge member may deflect rearward towards the A-pillar portion until the distal surface of the rearward-projecting protrusion contacts the A-pillar portion. When the distal surface of the rearward-projecting protrusion contacts the A-pillar, the rearward load that is applied to the hood hinge member may be directed into the A-pillar portion. The contact between the distal surface and the A-pillar portion may limit further rearward translation of the hood hinge member. Various embodiments of vehicles including load-transferring hood hinge members are described in detail below.

Figure 1:
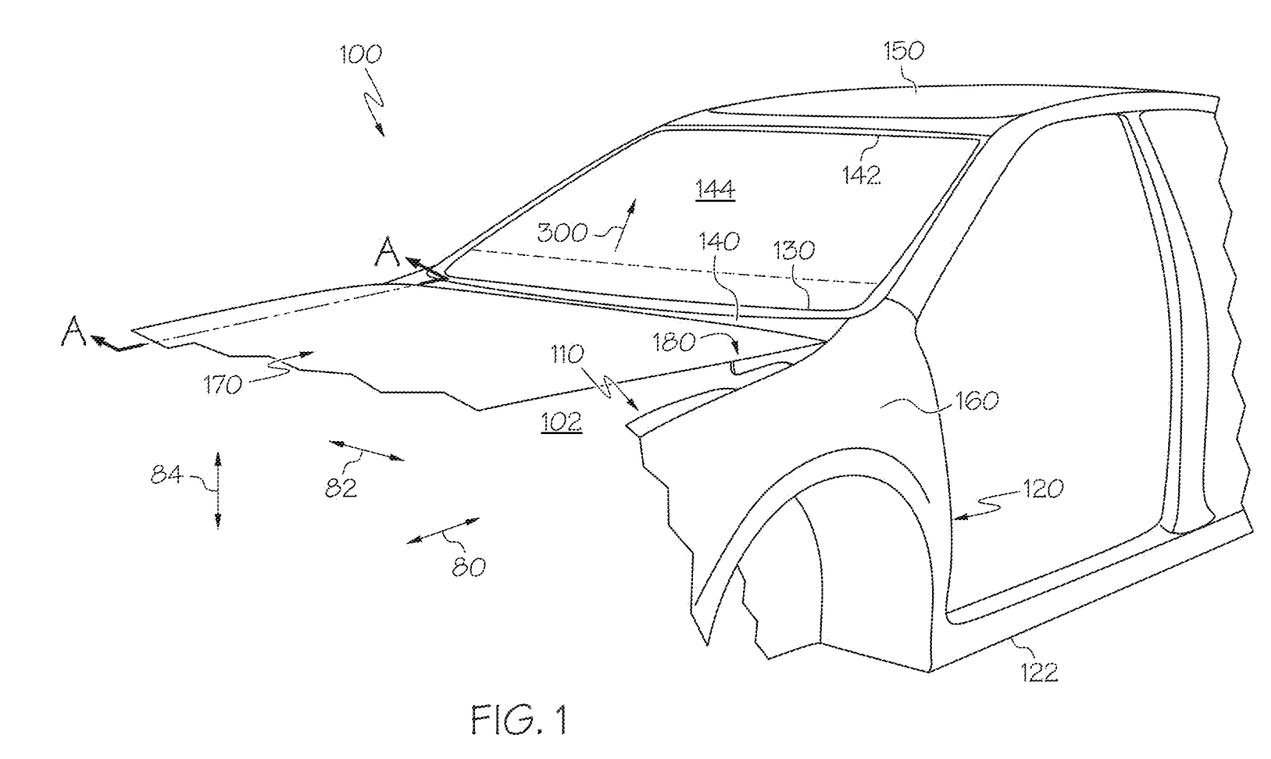
FIG. 1 schematically depicts a front perspective view of a portion of a vehicle structure according to one or more embodiments shown or described herein.

Referring now to FIG. 1, a vehicle 100 having a plurality of body panels is depicted. While discussion herein is directed to one side of the vehicle 100, it should be understood that various vehicle components may be symmetrical about the vehicle centerline. Thus, discussion herein should be understood to be applicable to both sides of the vehicle 100. In the depicted embodiment, the vehicle 100 includes an upper side member 110 that extends in a vehicle longitudinal direction 80. The upper side member 110 extends from an A-pillar portion 120 that generally extends in a vehicle vertical direction 84 from the rocker 122. The vehicle 100 may also include a dash panel 130 that is coupled to the A-pillar portion 120. The dash panel 130 may extend across the vehicle 100 in a vehicle lateral direction 82. The vehicle 100 may also include a cowl panel 140 that extends in the vehicle lateral direction 82 and is coupled to the A-pillar portion 120 and/or the upper side member 110. The A-pillar portion 120 of the vehicle 120 may also extend upward in the vehicle vertical direction 84 and rearward in the vehicle longitudinal direction 80 from the dash panel 130. The A-pillar portion 120 may extend to a roof cross member 142 at the roof 150 of the vehicle 100. A windshield 144 may be coupled to the vehicle 100 along the A-pillar portion 120, the cowl panel 140, and the roof cross member 142.

The vehicle 100 may also include a front fender 160 that is coupled to the upper side member 110. The front fender 160 defines the exterior shape of the vehicle 100 forward of a front door 144 and along the lateral-facing surfaces of the vehicle 100. The vehicle 100 may also include a hood 170 that is positioned between opposing front fenders 160 of the vehicle 100 at a position forward of the cowl panel 140.

As conventionally known, the hood 170 is positioned to selectively rotate between an open position and a closed position to provide access to the forward bay 102 of the vehicle 100. In some embodiments, the engine (not depicted) of the vehicle 100 is positioned in the forward bay 102. In other embodiments, the forward bay 102 of the vehicle encloses a vehicle storage compartment.

Figure 2:
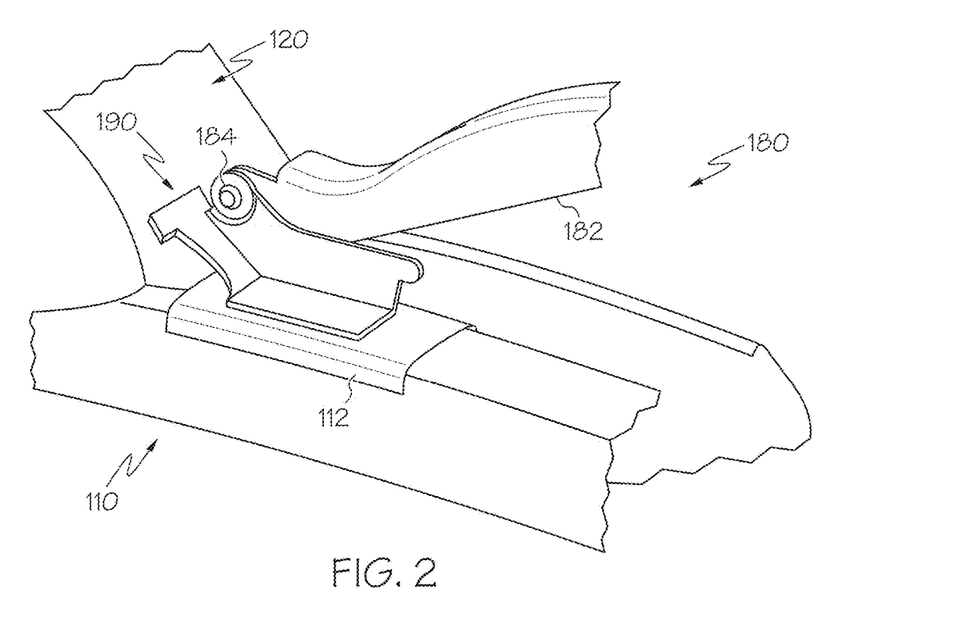
FIG. 2 depicts a front perspective view of a portion of a vehicle structure according to one or more embodiments shown or described herein.

In the embodiment depicted in FIG. 1, the hood 170 is coupled to the upper side member 110 by a hinge 180. Referring now to FIG. 2, the hinge 180 includes a hood hinge member 190 that is coupled to a vehicle structural component (here, the upper side member 110) and hood hinge arms 182. The hood hinge arms 182 are coupled to the hood (as shown in FIG. 1). The hood hinge arms 182 are configured to articulate about the hood hinge member 190 such that the hood can pivot between open and closed orientations. In the embodiment depicted in FIG. 2, the hood hinge arms 182 are coupled to the hood hinge member 190 through pivot joints 184. When the hood is operated by a user to move between the opened and the closed orientations, the hood hinge arms 182 pivot about the pivot joints 184. The pivot joints 184 maintain the positioning of the hood hinge arms 182 relative to the hood hinge member 190 and allow the hood to be articulated between the opened and closed orientations.

Still referring to FIG. 2, the hinge 180 includes the hood hinge member 190 that is coupled to the upper side member 110. The hood hinge member 180 is positioned forward of the A-pillar portion 120 and the cowl panel 140 (FIG. 1). In some embodiments, the upper side member 110 may also include a cowl patch 112. The cowl patch 112 may be positioned proximate to the interface between the upper side member 110 and the hood hinge member 180. The cowl patch 112 may be coupled to the upper side member 110 through a variety of attachment methods including, for example and without limitation, welding, brazing, mechanical fastening, and/or adhering with adhesive. The cowl patch 112 may locally supplement the strength and/or stiffness of the upper side member 110.

By supplementing the strength of the upper side member 110 at a position at which the hood hinge member 180 is coupled to the upper side member 110, the upper side member 110 may resist movement of the hood hinge member 180 upon application of a force. For example, if the vehicle is involved in an impact that directs force along the hood 170 and into the hood hinge member 180, the cowl patch 112 may supplement the strength and/or stiffness of the upper side member 110, such that the upper side member 110 may resist the force that directs the hood and the hood hinge member 180 rearward. By increasing the strength and/or stiffness of the upper side member 110, the upper side member 110 may provide increased resistance to movement of the hood hinge member 180. For example, the incorporation of the cowl patch 112 onto the upper side member 110 may limit rearward translation of the hood hinge member 180 upon introduction of force to the hood 170. The strengthened and/or stiffened upper side member 110 may therefore limit rearward translation of the hood 170 through reaction of force through the hood hinge member 180.

Figure 3:
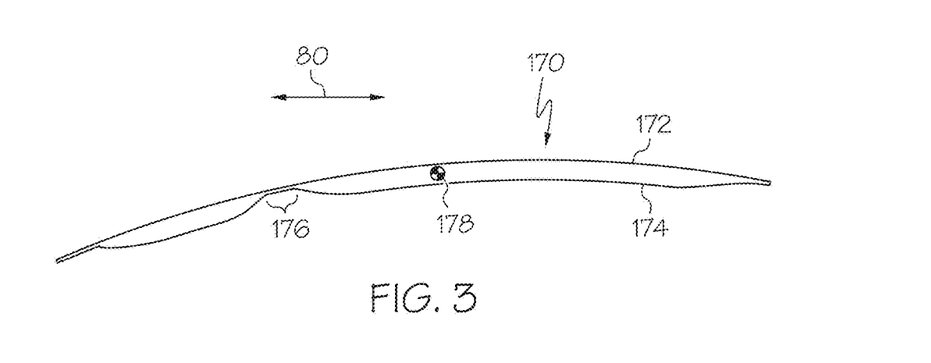
FIG. 3 depicts a side sectional view of a hood shown along line A-A of FIG. 1.

Referring now to FIG. 3, the hood 170 of the vehicle is depicted in cross-section. The hood 170 may include an outer skin 172 and an inner reinforcement 174 that is coupled to the outer skin 172 at a plurality of positions. When the hood 170 is installed in the vehicle, the outer skin 172 may be positioned above the inner reinforcement 174 such that the outer skin 172 of the hood 170 is viewable from the exterior of the vehicle under ordinary operating conditions. The inner reinforcement 174 may be shielded from view from the exterior of the vehicle under ordinary operating conditions.

The outer skin 172 may have a variety of contoured shapes based on the styling criterion of the vehicle. The inner reinforcement 174 may have a complementary shape as the outer skin 172 at a plurality of positions, such that the inner reinforcement 174 may be coupled to the outer skin 172. At positions between those at which the inner reinforcement 174 is coupled to the outer skin 172, the inner reinforcement 174 may be spaced apart from the outer skin 172. Through selective variation in the spacing between the outer skin 172 and the inner reinforcement 174, the inner reinforcement 174 may modify the stiffness and/or strength of the outer skin 172. The strength of the hood 170, therefore, may be modified based on the relative positioning of the outer skin 172 and the inner reinforcement 174.

Still referring to FIG. 3, the hood 170 may include a bead portion 176 that extends in the vehicle lateral direction across the hood 170. In some embodiments, the bead portion 176 may extend fully across the hood 170 in the vehicle lateral direction. In other embodiments, the bead portion 176 may extend across only a portion of the hood 170 in the vehicle lateral direction. As depicted in FIG. 3, the bead portion 176 may be positioned forward of a center of mass 178 of the hood 170 in the vehicle longitudinal direction. The bead portion 176 of the hood 170 is located at positions at which the inner reinforcement 174 is coupled to the outer skin 172 at positions across the hood 170 in the vehicle lateral direction. The bead portion 176 of the hood may reflect a position along the hood 170 at which the section modulus of the hood 170, evaluated about the vehicle lateral direction, is minimized. Because the bead portion 176 of the hood 170 corresponds to the position along the hood 170 at which the section modulus of the hood 170 is minimized, an application of force to the hood 170 in the vehicle longitudinal direction may tend to buckle the hood 170 at the bead portion 176.

Accordingly, if the vehicle is involved in an impact, the energy associated with the impact may apply forces to the hood 170 in the vehicle longitudinal direction 80. These forces may induce bending of the hood 170 about the bead portion 176, such that the hood 170 buckles about the bead portion 176. The hood 170 may have a buckling load limit that corresponds to the load that, when applied to the hood 170 in the vehicle longitudinal direction, causes the hood 170 to buckle.

Figure 4:
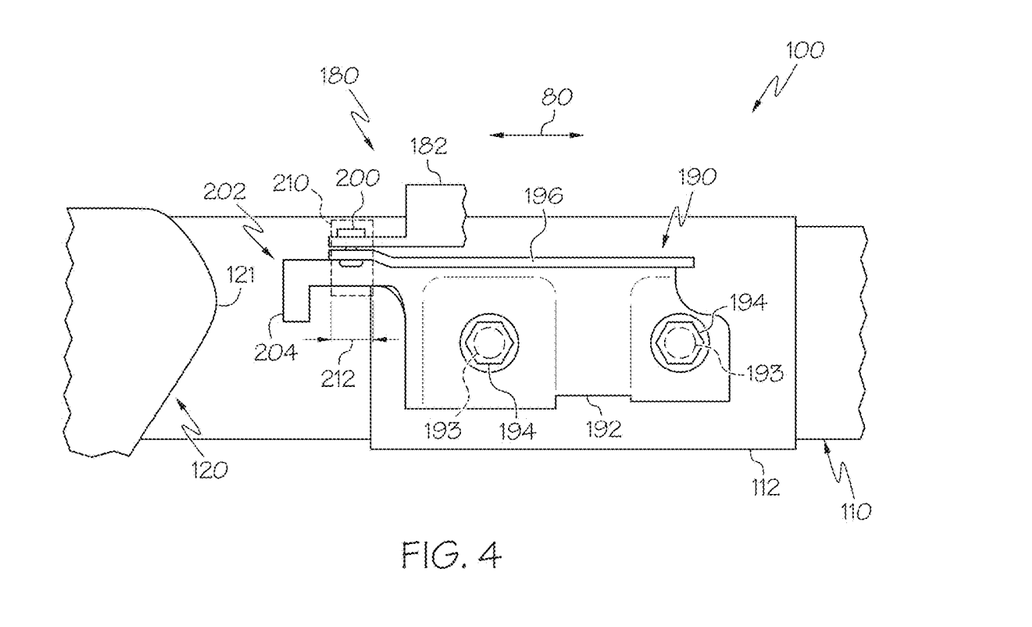
FIG. 4 depicts a top view of a portion of a vehicle structure according to one or more embodiments shown or described herein.
Figure 5:
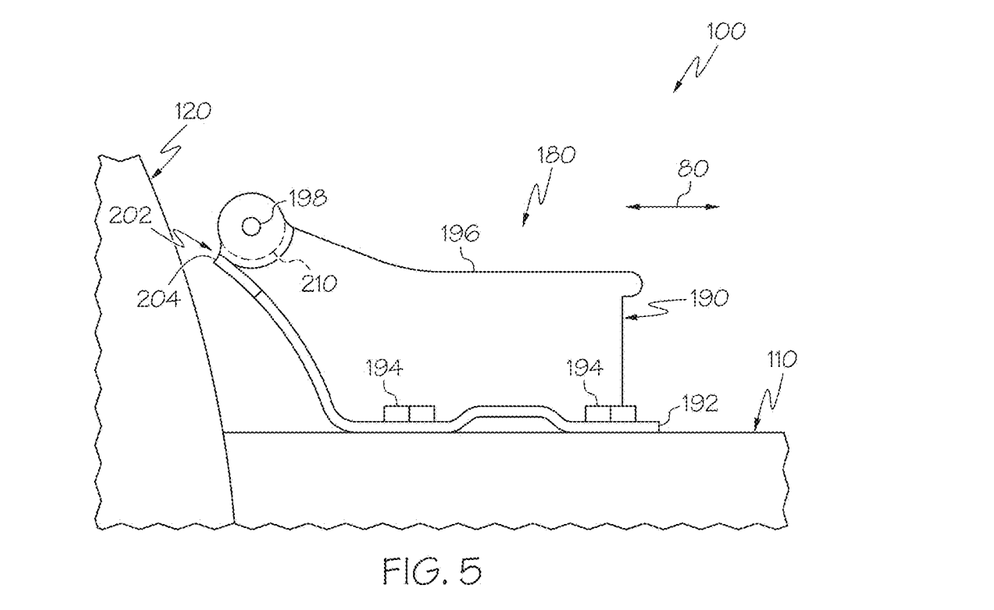
FIG. 5 depicts a side view of a portion of a vehicle structure according to one or more embodiments shown or described herein.

Referring now to FIGS. 4 and 5, a portion of the vehicle 100 that includes the hood hinge 180 is depicted. The hood hinge 180 includes the hood hinge member 190 that is coupled to the upper side member 110 of the vehicle. The hood hinge member 190 includes an attachment portion 192 that is coupled to the upper side member 110 of the vehicle 100. In the depicted embodiment, the attachment portion 192 includes a plurality of through-holes 193 that extend through the attachment portion 192, and through which mechanical fasteners 194 may be inserted. In such embodiments the mechanical fasteners 194 couple the hood hinge member 190 to the upper side member 110.

The hood hinge member 190 also includes a flange member 196 that extends upward from the attachment portion 192. In the depicted embodiment, the hood hinge member 190 includes a single flange member 196 that is coupled to the upper side member 110 of the vehicle 100. The flange member 196 may include a hood attachment opening 198 that passes through the flange member 196. The hood 170 may be coupled to the hood hinge member 190 through the hood attachment opening 198. In some embodiments, a hood hinge pin 200 may extend through both the hood attachment opening 198 and a corresponding opening through the hood 170. The hood may pivot about the hood hinge pin 200 between the opened and closed orientations.

Still referring to FIGS. 4 and 5, the hood hinge member 190 may also include a rearward-projecting protrusion 202. The rearward-projecting protrusion 202 may include a distal surface 204 that is positioned along the rearward-most position of the hood hinge member 190. The distal surface 204 of the hood hinge member 190 may extend in a direction that is transverse to the flange members 196. As depicted in FIGS. 4 and 5, the distal surface 204 of the hood hinge member 190 generally extends in the vehicle lateral direction, which is transverse to the flange member 196 of the hood hinge member 190 that generally extends in the vehicle longitudinal direction. The distal surface 204 may be axially aligned with an A-pillar extension portion 121 in the vehicle lateral direction. As depicted in FIGS. 4 and 5, the distal surface 204 of the hood hinge member 190 is positioned at the rearward-most position of the hood hinge member 190. However, in other embodiments, the distal surface of the hood hinge member may be spaced forward of the rearward-most position of the hood hinge member. As depicted in FIGS. 4 and 5, the distal surface 204 of the rearward-projecting protrusion 202 may be positioned below the hood attachment opening 200 when evaluated in the vehicle vertical direction.

Referring to FIGS. 4 and 5, the hood hinge member 190 may include a hood attachment envelope 210 that extends in a direction transverse to the flange member 196 and having a diameter 212 equivalent to the largest inscribed diameter that includes the surfaces of the flange member 196 that surround the hood attachment opening 198. The diameter 212 of the hood attachment envelope 210 may be concentric with the hood attachment opening 198. The diameter 212 of the hood attachment envelope 210 may be co-extensive with the surfaces of the flange member 196 that are concentric with the hood attachment opening 198. As depicted in FIG. 5, at least a portion of the distal surface 204 of the rearward-projecting protrusion 202 is positioned outside of the hood attachment envelope 210.

Still referring to FIG. 5, the hood hinge member 190 is depicted under ordinary vehicle operating conditions. Under ordinary vehicle operating conditions, the hood hinge member 190 may be positioned in a deactivated configuration in which the hood hinge member 190 is spaced apart from the A-pillar portion 120 in the vehicle longitudinal direction. In the depicted embodiment, the distal surface 204 of the rearward-facing protrusion 202 is the closest-spaced portion of the hood hinge member 190 to the A-pillar portion 120.

Figure 6:
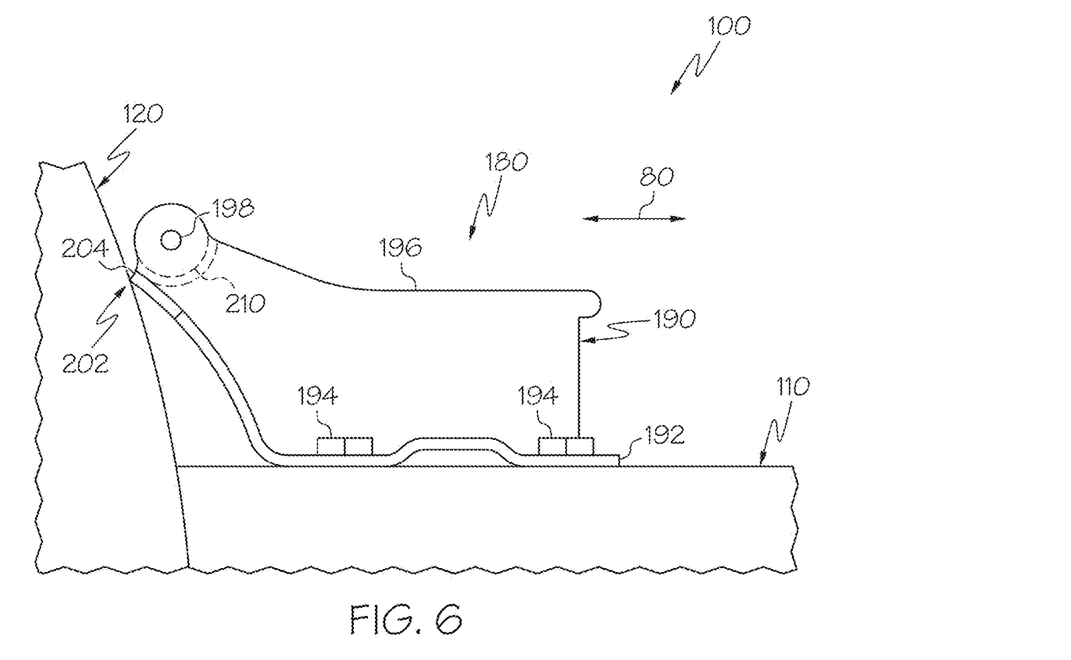
FIG. 6 depicts a side view of a portion of a vehicle structure according to one or more embodiments shown or described herein.

Referring now to FIG. 6, the portion of the vehicle 100 that is depicted is shown after undergoing an impact with a barrier. In the depicted embodiment, the hood may be deformed from its orientation in the deactivated configuration (as shown in FIGS. 1 and 3). Following a frontal impact with a barrier, energy of the impact may be introduced to the hood in a direction generally corresponding to the vehicle longitudinal direction 80.

Referring again to FIG. 3, the energy introduced to the hood 170 may elastically and plastically deform the hood 170, including buckling the hood 170. The hood 170 may buckle at a position corresponding to the position of the bead portion 176. The hood 170 may buckle at a buckling load limit, where the buckling load limit corresponds to a compressive stress in the hood 170 that is lower than the ultimate compressive strength of the material that the hood 170 is constructed from.

Referring again to FIG. 6, the introduction of energy and/or forces from the impact of the vehicle 100 and the barrier may introduce forces into the hood hinge member 190. The force introduced to the hood 170 from the impact may be transferred in the generally rearward direction, and may be reacted by the hood hinge member 190 and the upper side member 110. The flange member 196 may be relatively flexible as compared to the attachment portion 192 of the hood hinge member 190. The force of the impact that is introduced to the hood hinge member 190 may, therefore, elastically and/or plastically deform the flange member 196 in a generally rearward direction in the vehicle longitudinal direction 80. The flange member 196 may be deformed until the distal surface 204 of the rearward-facing protrusion 202 contacts the A-pillar portion 120. In some embodiments, the distal surface 204 may contact the A-pillar extension portion 121 (FIG. 4). Contact between the rearward-facing protrusion 202 of the hood hinge member 190 and the A-pillar portion 120 reflects an activated configuration of the hood 170 and the hood hinge member 190.

Through the contact between the rearward-facing protrusion 202 and the A-pillar portion 120, the A-pillar portion 120 provide a reaction force to forces associated with the impact and may limit further rearward translation of the flange member 196 of the hood hinge member 190. By limiting rearward translation of the flange member 196 of the hood hinge member 190, contact between the rearward-facing protrusion 202 and the A-pillar portion 120 may encourage plastic and elastic deformation of components that are positioned forward of and coupled to the hood hinge member 190, such as the hood 170. By encouraging plastic and elastic deformation of components such as the hood 170, contact between the hood hinge member 190 and the A-pillar portion 120 may reduce forces and/or energy associated with the impact that are directed into the passenger cabin of the vehicle 100. Further, following contact between the rearward-facing protrusion 202 and the A-pillar portion 120, forces associated with the impact may be directed into the A-pillar portion 120, which has strength and stiffness to direct the forces around passenger cabin of the vehicle 100. Additionally, in some embodiments, contact between the rearward-facing protrusion 202 of the hood hinge member 190 and the A-pillar portion 120 may prevent the hood 170 from entering a predefined windshield envelope 300.

The strength and stiffness of the hood hinge member 190 may be selected to target the deformation of the hood 170. For example, the hood hinge member 190 may exhibit a hood hinge member deformation limit that corresponds to the load that is introduced to the hood hinge member 190 that induces contact between the rearward-facing protrusion 202 and the A-pillar portion 120. Because the hood hinge member 190 is coupled to the upper side member 110 when installed into the vehicle 100, the hood hinge member deformation limit may account for the strength and stiffness of at least the hood hinge member 190, the upper side member 110 (including the cowl patch 112), and the A-pillar portion 140. The hood hinge member 190 may be designed with an increased or a decreased hood hinge member deformation limit to satisfy certain impact design conditions. For example, the hood hinge member deformation limit may be greater than the buckling load limit of the hood. In such embodiments, because the buckling load limit of the hood 170 is less than the hood hinge member deformation limit of the hood hinge member 190, introduction of energy into the hood 170 may first buckle the hood 170 prior to the rearward-facing protrusion 202 contacting the A-pillar portion 120. A design that incorporates a hood 170 having a buckling load limit that is less than the hood hinge member deformation limit may target plastic deformation of the hood, which may dissipate energy of the impact at a relatively forward position that is spaced apart from the passenger cabin of the vehicle 100.

In other embodiments, the hood hinge member deformation limit of the hood hinge member 190 may be less than the buckling load limit of the hood. In such embodiments, because the buckling load limit of the hood 170 is greater than the hood hinge member deformation limit of the hood hinge member 190, introduction of energy into the hood 170 through an impact may first induce contact between the hood hinge member 190 and the a-pillar 120 prior to buckling of the hood 170. A design that incorporates a hood 170 having a buckling load limit that is greater than the hood hinge member deformation limit may maintain the rearward-most position of the hood 170 relative to the A-pillar portion 120. In such embodiments, the magnitude of the energy that may be dissipated by the hood 170 may be supplemented through the energy-transferring contact between the rearward-facing protrusion 202 of the hood hinge member 190 and the A-pillar portion 120.

Following an impact, the energy that was introduced to the hood 170 and the hood hinge member 190 may dissipate, such that the stresses introduced to the vehicle components are relieved. Upon removal of the energy from the impact, the hood hinge member 190 may translate away from the A-pillar portion 120.

It should now be understood that vehicles according to the present disclosure may include a hood hinge member that is coupled to an upper side member and positioned forward of an A-pillar portion of the vehicle. The A-pillar portion may define an opening into which a windshield is coupled. The vehicle may include a hood that is coupled to the hood hinge member. Energy from the impact between the vehicle and a barrier may be introduced to the hood, thereby translating the hood rearward towards the A-pillar portion. The hood hinge member may include a rearward-facing protrusion that contacts the A-pillar portion, thereby distributing energy from the impact from the hood and into the A-pillar portion. Contact between the rearward-facing protrusion and the A-pillar portion may limit further rearward translation of the hood relative to the A-pillar portion, such that intrusion of the hood into the windshield may be limited.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   an A-pillar portion;
   an upper side member coupled to the A-pillar portion and extending forward from the A-pillar portion in a vehicle longitudinal direction;
   a dash panel coupled to the A-pillar portion and extending in a vehicle lateral direction that is transverse to the vehicle longitudinal direction; and
   a hood hinge member coupled to the upper side member and positioned forward of the A-pillar portion, the hood hinge member comprising:
      an attachment portion that is coupled to the upper side member;
      a flange member extending upward from the attachment portion;
      a hood attachment opening passing through the flange member; and
      a rearward-projecting protrusion comprising a distal surface that is positioned transverse to the flange member,
   wherein the hood hinge member further comprises a hood attachment envelope that extends from the flange member and has a diameter that is concentric with the hood attachment opening and is a largest inscribed diameter that contacts the flange member, and
   at least a portion of the distal surface of the rearward-projecting protrusion is positioned outside of the hood attachment envelope.

2. The vehicle of claim 1, wherein the rearward-projecting protrusion extends rearward from the flange member.

3. The vehicle of claim 1, wherein the distal surface of the rearward-projecting protrusion extends in the vehicle lateral direction.

4. The vehicle of claim 1, wherein at least a portion of the distal surface of the rearward-projecting protrusion is positioned below the hood attachment opening in a vehicle vertical direction.

5. The vehicle of claim 1, wherein, under ordinary vehicle operating conditions, the rearward-projecting protrusion is spaced apart from the A-pillar portion in the vehicle longitudinal direction.

6. The vehicle of claim 1, wherein the distal surface is the closest-spaced portion of the hood hinge member to the A-pillar portion.

7. The vehicle of claim 1, wherein the hood hinge member is repositionable between a deactivated configuration in which the rearward-projecting protrusion is spaced apart from the A-pillar portion and an activated configuration in which the rearward-projecting protrusion contacts the A-pillar portion.

8. The vehicle of claim 1, wherein the rearward-projecting protrusion is integrated into the flange member of the hood hinge member.

9. A vehicle comprising:
an A-pillar portion;
an upper side member coupled to the A-pillar portion and extending forward from the A-pillar portion in a vehicle longitudinal direction;
a dash panel coupled to the A-pillar portion and extending in a vehicle lateral direction that is transverse to the vehicle longitudinal direction;
a hood hinge member coupled to the upper side member and positioned forward of the A-pillar portion, the hood hinge member having a hood hinge member deformation limit that causes the hood hinge member to contact the A-pillar portion; and
a hood coupled to the hood hinge member and repositionable between an open position and a closed position, the hood having a buckling load limit at which the hood buckles,
wherein the hood hinge member deformation limit of the hood hinge member is greater than the buckling load limit of the hood.

10. The vehicle of claim 9, wherein the hood comprises a bead portion that is positioned forward of a center of mass of the hood, and the buckling load limit of the hood is evaluated at the bead portion.

11. The vehicle of claim 9, wherein the hood hinge member comprises:
an attachment portion that is coupled to the upper side member;
a flange member extending upward from the attachment portion;
a hood attachment opening passing through the flange member; and
a rearward-projecting protrusion comprising a distal surface that is positioned transverse to the flange member.

12. A vehicle comprising:
an A-pillar portion;
an upper side member coupled to the A-pillar portion and extending forward from the A-pillar portion in a vehicle longitudinal direction;
a dash panel coupled to the A-pillar portion and extending in a vehicle lateral direction that is transverse to the vehicle longitudinal direction; and
a hood hinge member coupled to the upper side member and positioned forward of the A-pillar portion, the hood hinge member comprising:
an attachment portion that is coupled to the upper side member;
a flange member extending upward from the attachment portion; and
a hood attachment opening passing through the flange member,
wherein the hood hinge member is repositionable between a deactivated configuration in which the hood hinge member is spaced apart from the A-pillar portion and an activated configuration in which the hood hinge member contacts the A-pillar portion,
wherein the hood hinge member further comprises a hood attachment envelope that extends from the flange member and has a diameter that is concentric with the hood attachment opening and is a largest inscribed diameter that contacts the flange member, and
a portion of the hood hinge member that is positioned to contact the A-pillar portion when the hood hinge member is in the activated configuration is positioned outside of the hood attachment envelope.

13. The vehicle of claim 12, wherein at least a portion of the hood hinge member that is positioned to contact the A-pillar portion when the hood hinge member is in the activated configuration is positioned below the hood attachment envelope in a vehicle vertical direction.

14. The vehicle of claim 12, wherein the hood hinge member further comprises a rearward-projecting protrusion comprising a distal surface that is positioned transverse to the flange member, and the rearward-projecting protrusion is space apart from the A-pillar portion when the hood hinge member is in the deactivated configuration and contacts the A-pillar portion when the hood hinge member is in the activated configuration.

15. The vehicle of claim 14, wherein the rearward-projecting protrusion extends rearward from the flange member.

16. The vehicle of claim 14, wherein the distal surface of the rearward-projecting protrusion extends in the vehicle lateral direction.

17. The vehicle of claim 14, wherein at least a portion of the distal surface of the rearward-projecting protrusion is positioned below the hood attachment opening in a vehicle vertical direction.

18. The vehicle of claim 14, wherein:
the hood hinge member further comprises a hood attachment envelope that extends from the flange member and has a diameter that is concentric with the hood attachment opening and is a largest inscribed diameter that contacts the flange member; and
at least a portion of the distal surface of the rearward-projecting protrusion is positioned outside of the hood attachment envelope.

* * * * *

UNITED STATES PATENT AND TRADEMARK OFFICE
CERTIFICATE OF CORRECTION

PATENT NO. : 9,593,517 B2  
APPLICATION NO. : 14/587680  
DATED : March 14, 2017  
INVENTOR(S) : Jonathan R. Young, Corinne D. Uskali and Colin M. Ravenscroft

Page 1 of 1

It is certified that error appears in the above-identified patent and that said Letters Patent is hereby corrected as shown below:

In the Claims

In Column 10, Line 34 & 35, after "protrusion is" delete "space" and insert --spaced--, therefor.

Signed and Sealed this
Sixteenth Day of May, 2017

Michelle K. Lee
*Director of the United States Patent and Trademark Office*